United States Patent [19]

Yasui et al.

[11] Patent Number: 4,489,954
[45] Date of Patent: Dec. 25, 1984

[54] ANTI-ROLLING SYSTEM FOR SNOWMOBILE OF SMALL SIZE

[75] Inventors: Toshihiro Yasui; Wayne L. Warnke, both of Coon Rapids, Minn.

[73] Assignee: Yamaha Hatsudoki Kabushiki Kaisha, Iwata, Japan

[21] Appl. No.: 450,075

[22] Filed: Dec. 15, 1982

Related U.S. Application Data

[62] Division of Ser. No. 213,167, Dec. 4, 1980.

[51] Int. Cl.³ .............................................. B62B 17/04
[52] U.S. Cl. .................................... 280/21 R; 180/190
[58] Field of Search ..................... 280/21 R, 21 A, 22, 280/25, 26, 94, 689, 16, 668; 180/182, 184, 190

[56] References Cited

U.S. PATENT DOCUMENTS

| | | | |
|---|---|---|---|
| Re. 28,423 | 5/1975 | Higginbotham | 280/25 X |
| 2,660,449 | 11/1953 | MacPherson | 280/668 X |
| 3,075,600 | 1/1963 | Ordorica et al. | 280/668 X |
| 3,613,812 | 10/1971 | Hetteen | 280/21 A X |
| 3,674,103 | 7/1972 | Kiekhaefer | 280/25 X |
| 3,835,947 | 9/1974 | Alexander, Jr. | 280/21 R |
| 3,900,208 | 8/1975 | Hjelmquist | 280/21 R X |
| 3,931,862 | 1/1976 | Cote | 280/25 X |

Primary Examiner—Joseph F. Peters, Jr.
Assistant Examiner—Michael Mar
Attorney, Agent, or Firm—Ernest A. Beutler

[57] ABSTRACT

An anti-roll and self-centering torsion bar arrangement for the front suspension of a snowmobile. A torsion bar is interconnected between the strut suspensions of the front skis so as to be loaded during cornering and prevent roll. In addition the point of connection between the torsion bar ends and the skis is such that a self-centering force is generated during steering movements. The torsion bar and its connection to the suspension is disposed so that the suspension and forwardmost portion of the body will be protected from damage when obstructions are encountered.

7 Claims, 7 Drawing Figures

ANTI-ROLLING SYSTEM FOR SNOWMOBILE OF SMALL SIZE

This is a division, of application Ser. No. 213,167, filed Dec. 4, 1980.

BACKGROUND OF THE INVENTION

This invention relates to a suspension system for a snowmobile and particularly to an anti-roll suspension for the steering skis of such a vehicle.

Due to the wide variety of terrains over which a snowmobile travels, it is desirable to provide a suspension, particularly for the sterring skis, which permits a relatively large degree of suspension travel. Such an arrangement permits good riding over surfaces which have a rough surface consisting of small irregularities. The smaller size snowmobile conventionally uses a leaf spring type suspension. Such suspension offers a relatively harsh ride over surfaces of the aforedescribed type because of the limited suspension travel. Therefore, it has been proposed to adapt strut type suspensions for such applications since such suspensions offer a wide degree of suspension movement. When large suspension travels are permitted, however, there is a high degree of body roll during cornering which is unsatisfactory, particularly when cornering at high speeds. It has, therefore, been proposed to provide a torsion bar anti-roll system for the steering skis of snowmobiles. However, the use of such systems present certain difficulties in that an arrangement must be incorporated so that the connection between the ends of the torsion bar and the skis does not restrict their steering travel.

It is, therefore, a principal object of this invention to provide an anti-roll system for the steering skis of a snowmobile which does not adversely effect the steering.

It is a still further object of this invention to provide an anti-roll system for the steering skis of a snowmobile wherein the anti-roll system also provides a self-centering action upon the steering skis.

As has been previously noted, snowmobiles travel over a wide variety of terrain. The suspension components of the steering skis of the snowmobile and the forwardmost portion of the body are exposed to the potential of damage particularly when snow conceals rigid obstructions. It is, therefore, a further object of this invention to provide a torsion bar arrangement for the steering skis of a snowmobile wherein the torsion bar and its attachment to the steering skis is arranged so as to provide protection for the body and suspension of the vehicle.

SUMMARY OF THE INVENTION

A first feature of this invention is adapted to be embodied in a suspension and steering system for a snowmobile or the like having a body and a pair of skis. The system comprises suspension means for suspending each of the skis for movement vertically relative to the body and independently of the other. The suspension means permits pivotal steering movement of each of the skis about a respective generally upstanding steering axis. Anti-roll means is incorporated which comprises a torsion bar supported by the body and means for connecting opposite ends of the torsion bar to respective of the skis for torsional loading of the torsion bar upon independent movement of the skis relative to the body. The connection between each of the skis and the torsion bar is such that the torsion bar is loaded by the pivotal movement of the skis about their steering axes for providing a self-centering force upon the skis.

Another feature of the invention is adapted to be embodied in a suspension and steering system for a snowmobile of the type described in the preceding paragraph. In connection with this feature of the invention, the means for connecting the respective skis to the respective torsion bar ends is offset from the steering axis of the skis.

Still a further feature of this invention is adapted to be embodied in a suspension and steering system for a snowmobile of the type described in the preceding paragraphs. In connection with this feature of the invention, generally vertically extending links connect the ends of the torsion bar to the respective of the skis. These links are disposed in a location so as to protect struts which suspend the skis from damage in the event the snowmobile encounters an obstruction.

In connection with still a further feature of the invention, the torsion bar of the suspension of the type aforedescribed is disposed across a forward underportion of the body structure of the snowmobile so as to protect it from damage if obstructions are encountered.

DETAILED DESCRIPTION OF THE PREFERRED EMBODIMENT

Figure 1:
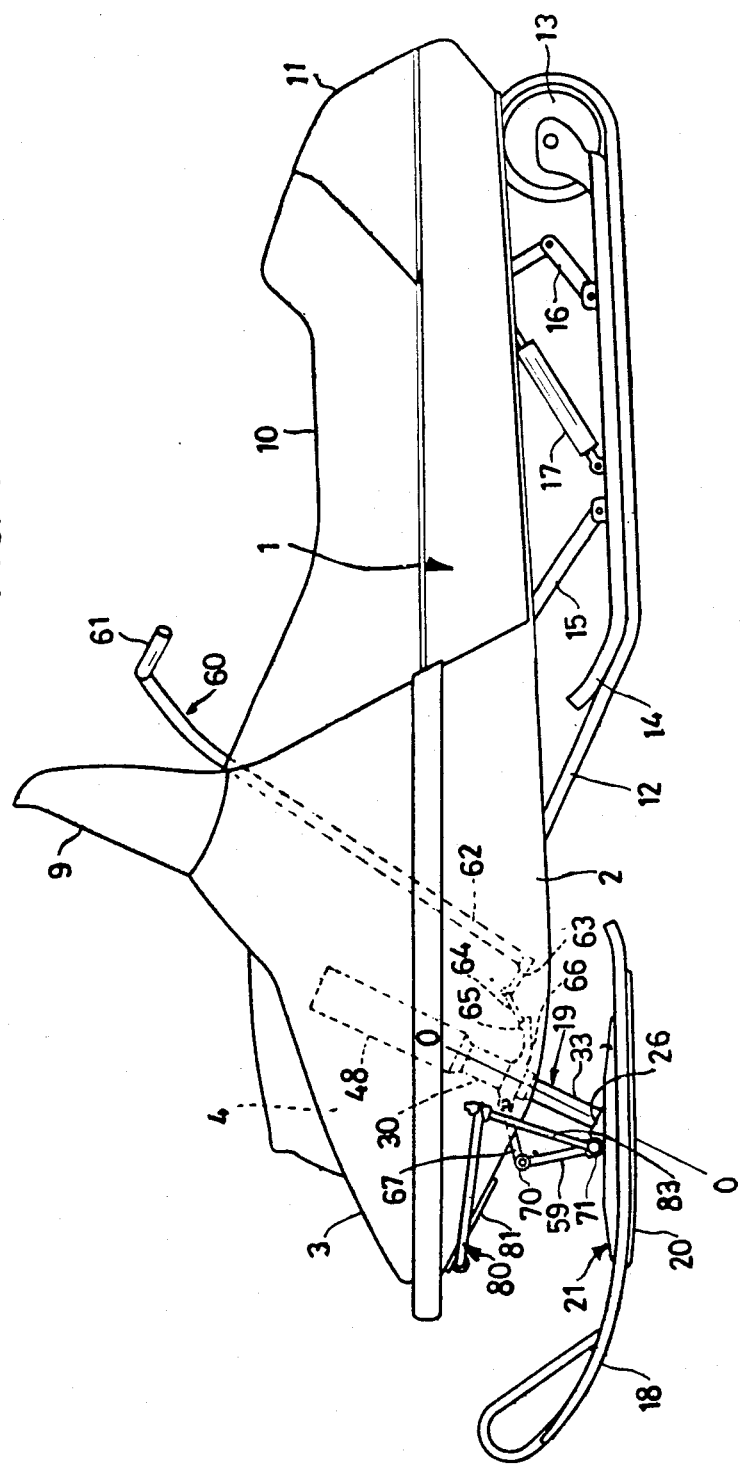
FIG. 1 is a side elevational view of a small snowmobile embodying this invention.
Figure 2:
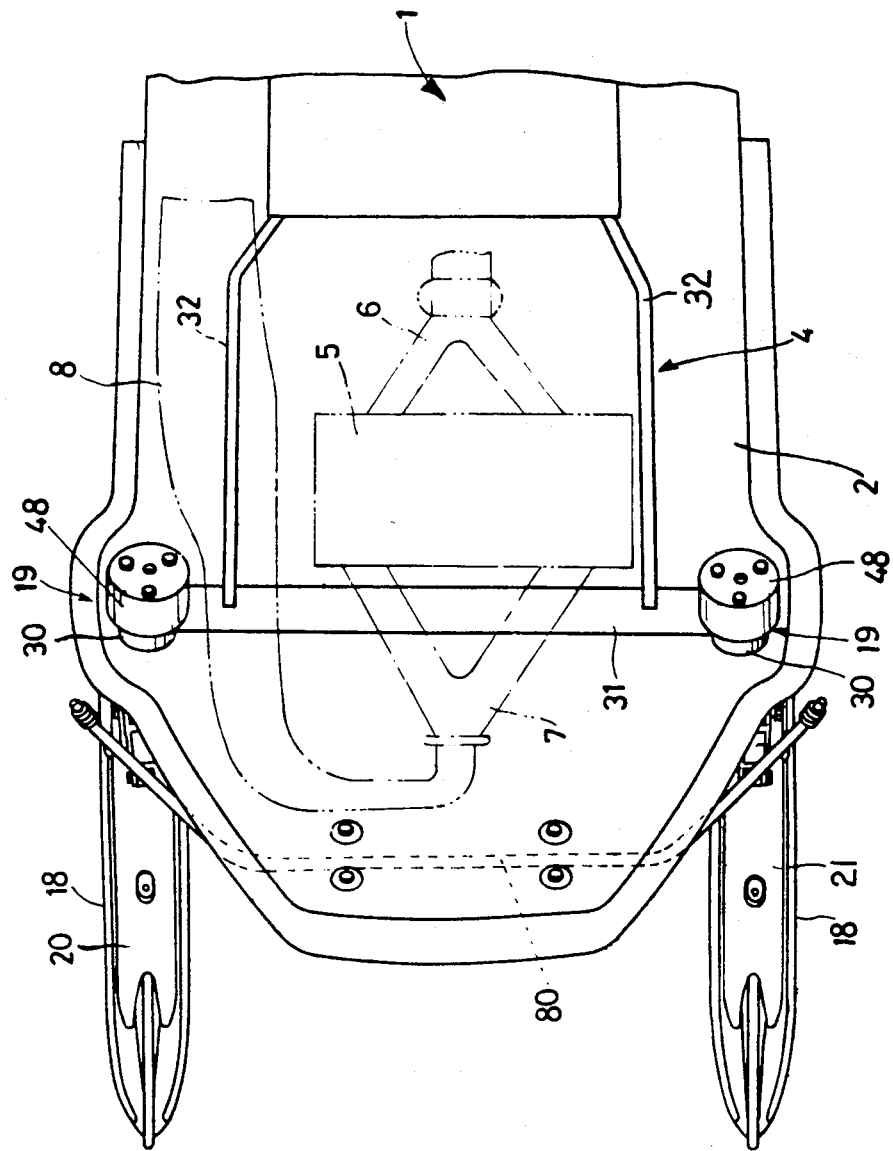
FIG. 2 is a top plan view of the forwardmost portion of the snowmobile.

In the drawings the reference numeral 1 indicated generally a snowmobile constructed in accordance with this invention. The snowmobile, which has a body which includes a bottom cover 2 and upper front cover 3. The covers 2 and 3 define an engine compartment, indicated generally by the reference numeral 4. An engine 5, of any known type such as an air cooled, two-cycle, two-cylinder engine, is located in the engine compartment 4. The engine 5 includes an induction system, indicated schematically as 6, an exhaust manifold indicated schematically at 7, and a muffler 8 (FIG. 2). The engine 5 drives the snowmobile 1 through a v-belt type automatic transmission mechanism through an appropriate sprocket assembly (not shown).

At the rear of the upper front cover 3, there is disposed a windshield 9 behind which a seat 10 and luggage compartment 11 are positioned, as is well known in this art.

The V-belt type automatic transmission drives a main drive belt 12 in any known manner, for example, by means of a forward input sprocket (not shown). The rear end of the drive belt 12 runs around a guide wheel 13 and across a guide rail 14. The belt 12 is suspended relative to the body of the snowmobile 1 by means of links 15 and 16, a shock absorber 17, and a spring (not shown) in any known manner.

At the forward end of the snowmobile 1 there are a pair of front steering skis 18. The skis 18 underlie in part the bottom cover 2 and are suspended by respective strut type suspensions, indicated generally by the reference numeral 19 and shown in more detail in FIG. 3.

Figure 3:
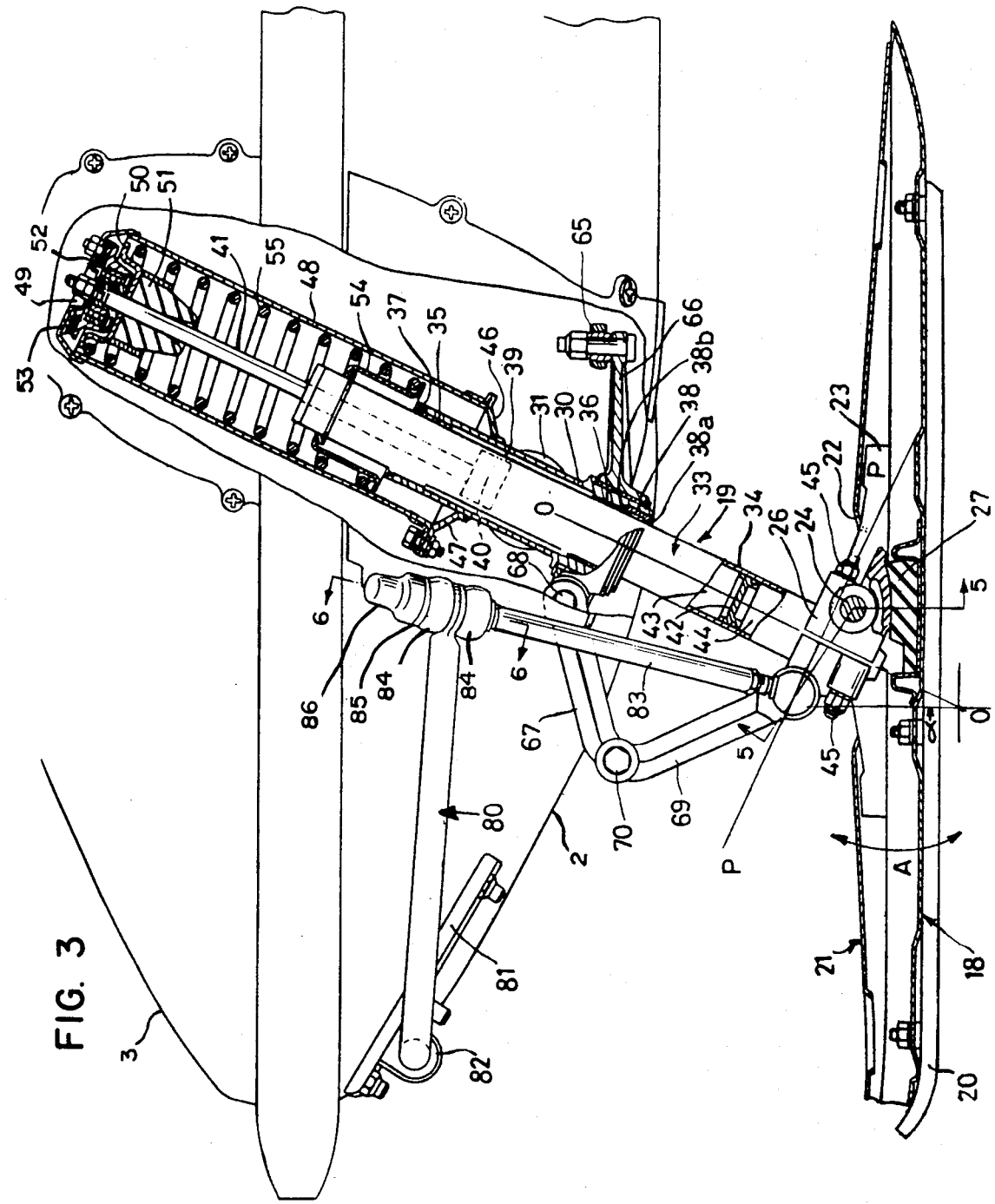
FIG. 3 is a side elevational view, with portion shown in section, showing the steering ski suspension system.
Figure 4:
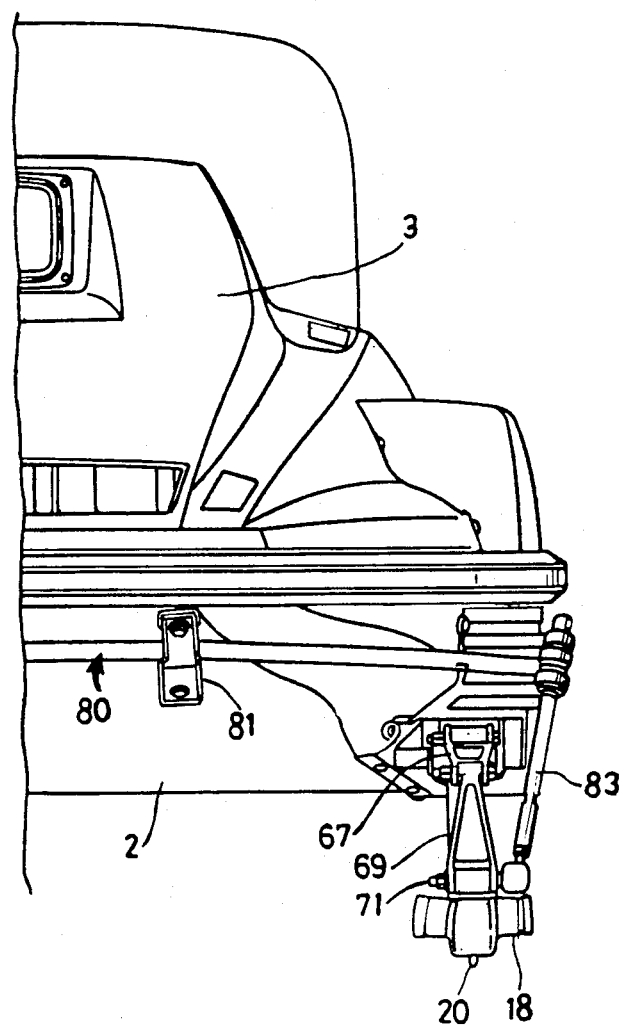
FIG. 4 is a front elevational view of one half of the snowmobile.
Figure 5:
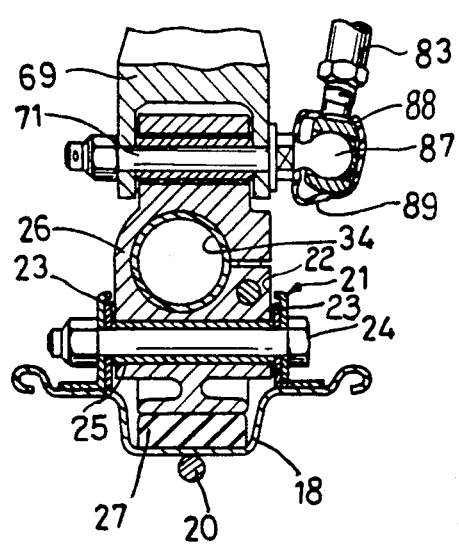
FIG. 5 is an enlarged cross-sectional view taken along the line 5—5 of FIG. 3.

Each of the skis 18 has a cross-sectional configuration as best shown in FIG. 5. A metal runner 20 is affixed to the underside of the ski 18 and extends for a substantial portion of its length, as is well known. The skis 18 have a generally channel shape construction in cross-section and have affixed to their center portions a cover, indicated generally by the reference numeral 21, which is of a dome cross-sectional shape having a central opening 22. Opposite sides of the cover 21 are reinforced by a pair of longitudinally extending plates 23. Positioned between the plates 23 and extending upwardly through the opening 22, is a connecting bracket 26 which affords the connection between the struts 19 and the skis 18 as will be described. The lower end of the bracket 26 is pivotally connected to the cover plate 21 and respective ski 18 by means of a bolt and nut assembly 24 and bushing 25. The lower end of the bracket 26 engages the upper surface of a rubber damper 27. The lower end of the damper 27 is interposed between the bracket 26 and the uppermost surface of the channel of the ski 18 so as to exert a restoring force on the ski 18 so that it tends to retain the ski 18 in a substantially horizontal position relative to the body of the snowmobile 1. The damper 27 exerts a force on the ski 18 relative to the pivot axis defined by the bolt and nut assembly 24 which acts in the direction of the arrow "A" as shown in FIG. 3.

The construction of the strut assembly 19 will now be described, by reference primarily to FIG. 3. Each strut assembly 19 includes a cylindrical housing 30 that is fixed to a cross member 31 of the frame of the snowmobile 1 so as to define a generally vertically extending steering axis which has a predetermined caster angle $\alpha$ with respect to the vertical. This steering axis is identified by the line O—O in the drawings. The cross member 31 is a part of the snowmobile frame and in the illustrated embodiment is affixed to the longitudinally extending frame members 32 in any known manner (FIG. 2).

A hydraulic shock absorber, indicated generally by the reference numeral 33, has its cylinder 34 slideably and rotationally supported within the housing 30 at each side of the cross member 31 for axial movement along the line O—O and for steering rotation about this axis. For this purpose bearings 35 and 36 are interposed between the housing 30 and a cylindrical outer surface of the cylinder 34. Adjacent the upper and lower surfaces of the bearings 35 and 36, seals 37 and 38 are provided. These seals 37 and 38 serve the normal purpose of protecting the bearings 35 and 36 from the ingress of foreign material. The lower seal 38 is provided with a wiping lip 38a which extends downwardly and outwardly and engages the surface of cylinder 34 so as to prevent intrusion of ice from the environment into the interior of the assembly. An oil sealing lip 38b is formed integrally with the seal 38 so as to provide oil retention and to insure against leakage downwardly from this area. A grease and lubricating chamber 39 of annular configuration is provided between the seal 37 and the oil seal lip 38b which may be lubricated in a suitable manner so as to lubricate the suspension for each ski.

The shock absorber 33 for each ski 19 also includes a piston 40 which is affixed to a piston rod 41 and which extends into the bore of the cylinder 34 and which with the other interior components of the shock absorber 33 may be appropriately valved so as to provide the desired shock absorber characteristics. A free piston 42 is supported in the lower end of the cylinder 34 below the shock absorber piston 40 so as to provide an upper chamber 43 which is charged with oil, and a lower chamber 44 which is charged with a gas such as nitrogen under a higher than atmospheric pressure so as to urge the piston 40 and piston rod 41 upwardly relative to the shock absorber cylinder 34 as is well known in this art.

The lower end of the cylinder 34 is affixed to the bracket 26 against radial and axial movement so as to directly affix the ski 18 to the lower end of the suspension system 19. For this purpose, the bracket 26 is formed with an appropriate bore and clamping arrangement which includes clamping bolts 45 and appropriate nuts so that the bracket 26 will be directly affixed to the lower end of the cylinder housing 34. Thus, vertical movement of the ski 18 will be directly transmitted to the cylinder 34. As has been previously noted, the skis 18 may pivot relative to the cylinder 34 about the pivot bolts 24.

At its upper end the cylinder housing 30 extends through a flange plate 46 which is provided with a venting and drain hole 47. The flange plate 46 is affixed to a cylinder housing 48 which is coaxially disposed with the shock absorber cylinder 34 and which is fixed in any suitable manner to the snowmobile frame.

The upper end of the piston rod 41 passes through a spring seat 50 and is fixed against axial and rotatable movement relative to the frame of the snowmobile 1 in any known manner. The spring seat 50 carries a jounce stopper 51 formed from a elastomeric material which encircles the piston rod 41 and is adapted to resiliently limit the upward movement of each ski 18 relative to the body and frame of the snowmobile 1.

A thrust bearing 52 is interposed between the upper end of the piston rod 41 and the spring seat 50 so as to permit rotation of the piston rod 41 about the steering axis O—O. A suitable nut extends through an opening 49 in the upper end of the assembly as to permit axial loading for the thrust bearing 52. An annular elastomeric member 53 is interposed below the recess 49 so as to provide an appropriate seal in this area.

A coil spring 55 is interposed between the spring seat 51 and a lower reaction seat 54, which is, in turn, affixed in any known manner to the cylinder 34 of the shock absorber 33 so that the spring 55 will be loaded upon relative movement between the piston 40 and the cylinder 34. The spring 55 further acts to suspend the snowmobile body from the skis 18, as is believed to be apparent from the foregoing description.

As has been noted, the skis 18 are rotatable about the steering axis O—O for steering movement as well as being vertically moveable relative to the body of the snowmobile 1 along this axis. Thus, the axis O—O serves as a steering axis as well as a suspension axis, which is generally vertically upstanding except for the caster angle $\alpha$.

A steering system, indicated generally by the reference numeral 60, is provided for steering the snowmobile 1 by turning of the skis 18 about their respective steering axes O—O. This steering system includes an operator-controlled handlebar 61 which is affixed to rotate a steering column 62, which is, in turn rotatably supported by the frame of the snowmobile 1 in any known manner. At the lower end of the steering column 62, there is affixed a pitman arm 63 which extends forwardly and which has the known type of pivotal connection to right and left tie rods 64. The opposite ends of each of the tie rods 64 are pivotally connected by ball joints 65 to steering arms 66. The steering arms 66 at each side of the snowmobile 1 are journaled upon cylindrical outer surfaces and interposed bearings of the cylindrical housing 30 adjacent the seals 38.

Each steering arm 66 as a forwardly extending portion which is connected to the trailing end of a downwardly and forwardly extending suspension link 67 by means of a pivot pin 68. The forward end of each link 67 is pivotally connected to the corresponding end of a downwardly extending trailing link 69 by means of a pivot pin 70. The lower ends of the links 69 are bifurcated and are pivotally connected with the brackets 26 of the respective ski 18 by means of pivot pins in the form of suspension bolts 71. The pivot pins 68, 70 and 71 have their pivot axes disposed parallel to each other and extend at a right angle to the steering axis O—O.

The advantage of the strut type suspension 19 in connection with a snowmobile centers around the fact that it permits substantial suspension travel of the skis 18 relative to the snowmobile frame. This permits a relatively soft ride which would not be possible with a more conventional type of leaf spring suspension normally used with small snowmobiles. However, such large suspension travel raises the problem of roll and possible reduction in control when turning, particularly at high speeds. In order to obviate these difficulties, an anti-roll torsion bar, indicated generally by the reference numeral 80, is provided. The torsion bar 80, as will become apparent, in addition to reducing roll during cornering, provides protection for the steering and suspension components as well as the body of the snowmobile 1, and particularly the lower body panel 2. The torsion bar 80 and its connection to the skis 18 further are geometrically arranged so as to provide a self-centering action for the steering.

The anti-roll torsion bar 80 has generally a "U" shape and trailing configuration. The transverse portion of the torsion bar 80 is supported by the forwardmost underside of the body of the snowmobile and specifically by the bottom cover 2 at a pair of transversly spaced locations by means of mounts 81. Elastomeric bushings 82 are interposed between the mounts 81 and the respective ends of the torsion bar 80 so as to affix intermediate transversely extending portions of the torsion bar 80 relative to the body portion 2 without significantly resisting the torsional loading of this portion of the bar 80.

The brackets 81 are located at the forwardmost end of the bottom cover 2 with the transverse portion of the torsion bar 80 extending across this cover. The trailing ends of the torsion bar 80 extend rearwardly along the sides of the bottom cover 2 toward the struts 19 and terminate outwardly of them as clearly shown in FIG. 2. As a result of this disposition of the torsion bar 80, it serves to protect the forwardmost underside of the bottom cover 2 and struts 19 from damage in the event obstructions are encountered.

Figure 6:
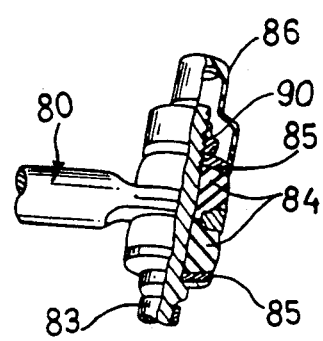
FIG. 6 is a cross-sectional view taken along the line 6—6 of FIG. 3.

Links 83 interconnect the respective torsion bar ends with the skis 18 via the connecting brackets 26. The connection is such that the torsion bar 80 will be torsionally loaded in the event of different relative movements between each of the skis 18 and the body of the snowmobile 1. The connection between the ends of the torsion bar 80 and the upper end of each link 83 is best shown in FIG. 6. The torsion bar ends are formed with flattened portions through which an opening extends. The upper ends of the links 83 pass through the respective torsion bar openings and upper and lower grommets 84 are interposed by the respective torsion bar end and a pair of cup shape washers 85. The lowermost washer 85 bears against a shoulder formed on the portion of the link 83 below the torsion bar end. The uppermost washer 85 is contained by a nut 90 that is received upon the threaded upper end of the link 83 so as to provide a connection between the torsion bar end and the link 83 that permits a limited degree of pivotal movement. An elastomeric boot 86 encircles the screw and nut connection so as to prevent the ingress of contaminating materials into this area.

At the lower end of each of the links 83, there is a pivotal connection to the respective ski 18, which is best shown in FIG. 5. To provide this pivotal connection, the bolt 71 which, as has been noted, connects the links 69 to the bracket 26 for pivotal movement, is formed with a spherical ball portion 87. The lower end of the link 83 carries a socket 88 which affords a universal pivotal connection to the ball 87 in a known manner. This connection is protected by an elastomeric boot 89. It should thus be clear that movement of the ski 18 relative to the body of the snowmobile 1 along the axis O—O of the strut 19 exerts force through the link 83 to the torsion bar 80.

As has been noted, the axis O—O along which the strust 19 reciprocates is disposed at a caster angle α to the vertical. A line P—P passing through the axis of the joint provided between the ball 87 and socket 88 and perpendicular to the axis O—O extends upwardly and forwardly as clearly shown in FIG. 3. As may be seen in FIG. 7, the point of connection defined by the ball 87 and socket 88, indicated by the point 91, is disposed outwardly of a longitudinally center line X—X extending through each ski 18 and containing the plane of the steering axis O—O of each ski. The angle between the point 91 and the intersection of the axis O—O with the axis X—X is the same with respect to each ski but in opposite senses, as may be readily apparent from FIG. 7.

When travelling in a straight path, the skis 18 are free to assume a correct attitude with respect to the ground through pivotal movement relative to the bracket 26 about the pivot pins 24. The elastomeric dampers 27 will have the effect of resiliently maintaining the skis 18 in their normal attitude. If an obstruction is encountered or unevenness of the ground is experienced, each ski 18 will move upwardly about the axis O—O effecting pivotal movement of the links 67 and 69 about the pivot points 68, 70 and 71. Since these pivot axes are parallel to each other, the skis 18 will be held against any pivotal movement about the axis O—O which might otherwise effect steering of the snowmobile during suspension travel. The shock absorber strut 19 and spring 55 will act in the obvious manner so as to damper and cushion these vertical movements and provide a good ride over a wide variety of terrains.

If the amount of relative movement between each ski 18 and the body is the same, the torsion bar 80 will be merely pivoted in its bushings 82 through the action of the links 83 and will not effect the suspension characteristics. If, however, there is some unevenness from side to side, the torsion bar 80 will be appropriately loaded so as to transfer some of the load from the ski 18 at one side to the other.

If the snowmobile 1 is travelling along level terrain and a steering input is delivered by the operator to the steering column 62 by turning of the handlebars 61, the pitman arm 63 will be rotating in the appropriate direction. Rotation of the pitman arm 63 will be transmitted through the respective tie rods 64 and ball joints 65 to rotate the steering arms 66. Since the steering arms 66 are pivotally supported by the housing 30 for rotation about the axis O—O, the pivot pin 66 at the upper end of the link 67 will also be rotated at the same angle. Since the pivot pins 68, 70 and 71 are held at right angles to each other by the links 67 and 69, the bracket 26 and ski 18 will be rotated through the corresponding steering angle so as to change the direction of the snowmobile 1. At the same time, the entire strut assembly 19 will be rotated via the support provided by the bearings 52, 35 and 36 about the same steering axis O—O.

During the steering movement, the skis 18 may still move upwardly and downwardly relative to the body of the snowmobile 1 if rough surfaces are encountered. The struts 19 and spring 55 will act in their normal manner but the links 67 and 69 and their related pivot points 68, 70 and 71 will insure against any change in the steering attitude due to these up and down movements.

If during the turning movement there is a roll force exerted on the body of the snowmobile 1, the strut 19 and spring 55 associated with the outboard ski 18 will tend to move upwardly more than the inboard strut and spring. This relative movement will cause a torsional loading in the torsion bar 80 due to a greater period movement at its end associated with the outboard link 83 than at the inboard link 83. Thus, a torsional loading is applied to the torsion bar 80 which tends to cause the inboard and outboard struts to equalize their movements relative to the body of the snowmobile 1. Thus, an anti-roll force is generated by the torsion bar 80 and its attachment to the skis 18.

Figure 7:
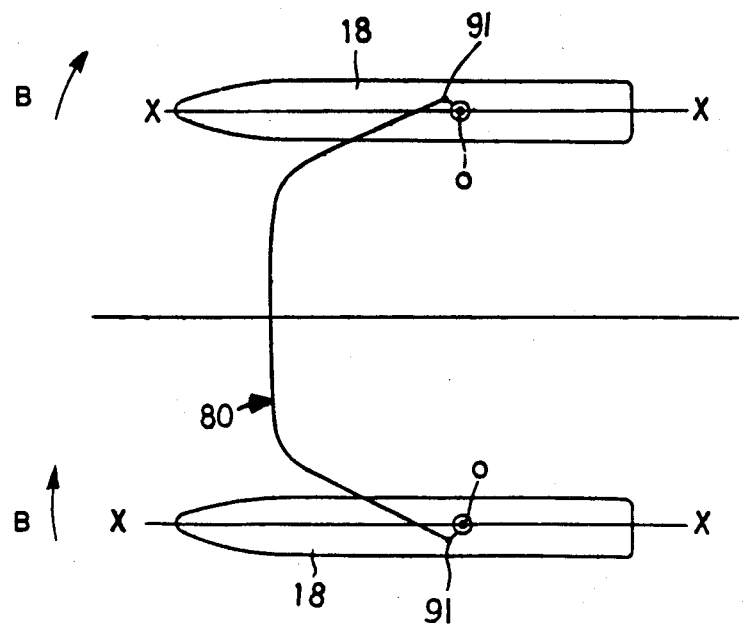
FIG. 7 is a schematic top plan view of the steering suspension system illustrating one of the principles of the invention, and is taken along a plane containing the line P—P of FIG. 3.

In addition to providing the anti-roll effect, the torsion bar 80, and the location of its connections to the skis 18 and specifically the brackets 26, provides a self-centering effect on the steering, as may become more evident from an inspection of FIG. 7. As has been noted, the points 91 of the connection between the links 83 and the brackets 26 are disposed outwardly of lines X—X passing through each ski 18 when the snowmobile 1 is travelling in a straight ahead direction. Assuming a steering input is placed upon the skis 18 in the aforedescribed manner to rotate them in the direction shown by the arrow "B", the point 91 is also rotated in the same direction. Since the line P—P passing through the point 91 and perpendicular to the steering axis O—O extends upwardly, the link 83 at the lowermost portion of FIG. 7 more upwardly and applies a twisting force to the torsion bar 80. At the same time, the uppermost link 83 moves in a downward direction and hence exerts a downward force on its corresponding end of the torsion bar 80 so as to further increase the torsional loading upon it. As a result, if the operator abruptly removes his hands from the handlebar 61, the torsion bar 80 will exert forces on the skis 18 through the links 83 tending to rotate them back to their straight ahead position in opposition to the direction B—B. Thus, there is a significant self-centering action, the advantages of which are believed to be obvious. It should be readily apparent that this self-centering action will be equally effective when the skis 18 are turned in the direction opposite to the arrow "B" from their straight ahead position.

The described self-centering action will not impair with the anti-roll effect of the torsion bar 80. The anti-roll effect due to the eccentric condition of the points 91 will further add in the self-centering action to limit unstable operation due to extreme steering inputs.

Even though the torsion bar 80 acts to reduce roll during cornering and provides the self-centering action for the steering, it does not offer significant resistance to steering imputs. The resilient connections at the upper ends of the links 83 and the ball and socket connections at their lower ends accomodates steering movements without significantly adding to the force required to steer the snowmobile 1.

As has been noted, the location of the torsion bar 80 at the forward end and lowermost portion of the body, and specifically the bottom cover 2, is effective so as to protect the body from damage when encountering an obstruction. Furthermore, the forward positioning of the cross part of the torsion bar 80 permits it to be used as a handle for lifting the forward end of the snowmobile. The outward flaring of the ends of the torsion bar 80, as shown in FIG. 2, and the positioning of the links 83 forward of the struts 19 acts to further protect both the body and the struts from damage.

In the described embodiment the torsion bar ends are connected to the brackets 26 via the links 83. It is to be understood that the torsion bar ends may be directly connected to the brackets 26 without using the links 83. Various other changes and modifications may be made without departing from the spirit and scope of the invention as defined by the appended claims:

We claim:

1. A suspension and steering system for a snowmobile or the like having a body and a pair of skis comprising suspension means comprising a pair of struts having telescoping elements for suspending each of the skis for movement vertically relative to the body independently of each other, said suspension means permitting pivotal steering movement of each of said skis about a respective generally upstanding steering axis, and anti-roll means comprising a torsion bar supported by the body and means for connecting opposite ends of said torsion bar to respective skis for torsional loading of said torsion bar upon independent movement of the skis relative to the body, the connection between said torsion bar ends and the respective skis comprising a pair of generally vertically extending links, each of said links being disposed in front of and outwardly of a respective strut in a location to protect said struts from damage in the event the snowmobile encounters an obstruction in the direction of forward travel.

2. A suspension and steering system as set forth in claim 1 wherein the lower ends of the links have a ball and socket connection to the skis and the upper ends of the links have a resilient connection to the torsion bar ends.

3. A suspension and steering system as set forth in claim 2 wherein the torsion bar has a generally "U" shape, the intermediate section of said torsion bar being disposed at the forwardmost lower end of the snowmobile for protecting the body from damage.

4. A suspension and steering system as set forth in claim 3 wherein the struts are supported for pivotal movement relative to the body for defining the steering axis, the ball and socket connection between the lower end of the link and the respective skis being positioned eccentrically to the steering axis.

5. A suspension and steering system as set forth in claim 3 wherein the ends of the U-shaped torsion bar extend along opposite sides of the lower most front end of the snowmobile for protecting the body from damage.

6. A suspension and steering system for a snowmobile or the like having a body and a pair of skis comprising suspension means for suspending each of the skis for movement vertically relative to the body independently of the other, said suspension means permitting pivotal steering movement of each of said skis about a respective generally upstanding axis, anti-roll means comprising a torsion bar supported by the body in a location extending across the forward lowermost surface of the body for protecting the body if obstructions are encountered and vertically extending means connecting the ends of said torsion bar to said skis, said vertically extending means being positioned forwardly and outwardly relative to said suspension means for protecting said suspension means.

7. A suspension and steering system as set forth in claim 6 wherein the torsion bar has a generally U-shaped configuration with the intermediate portion extending across the forward lowermost surface of the body and the end portions thereof extending rearwardly from the intermediate portion and on opposite sides of the lowermost surface of the body for protecting the body, the means for connecting the torsion bar ends to the skis being operatively connected to the rearward ends of said end portions.

* * * * *